Patented Feb. 7, 1939

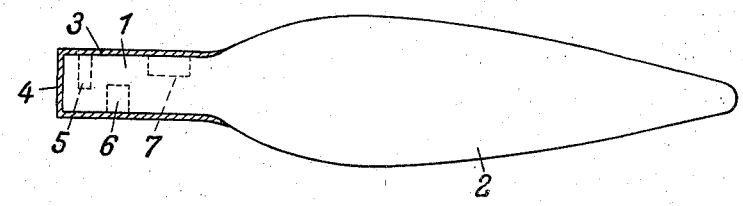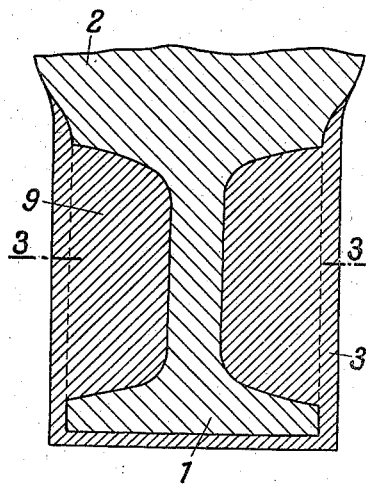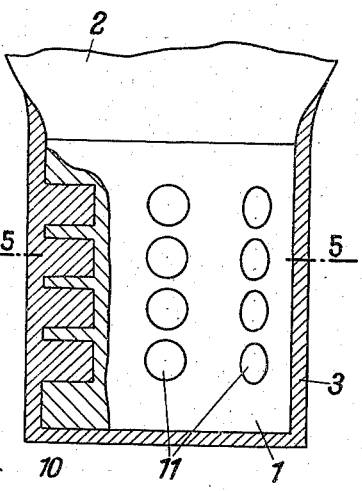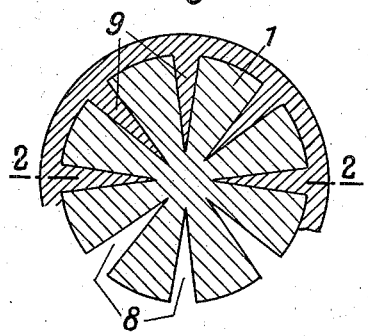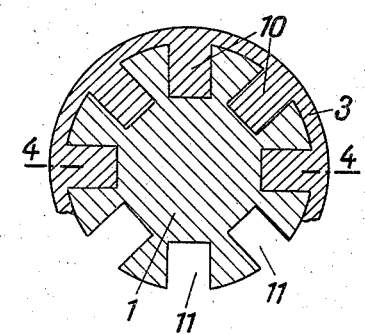

2,146,342

UNITED STATES PATENT OFFICE 2,146,342

AIR SCREW

Alfred Koyemann, Hamburg, Germany, assignor, by mesne assignments, to Naamlooze Vennootschap Derde Nederlandsche Patentenmaatschappij (D. N. P. M.), The Hague, Netherlands, a Dutch company Application July 14, 1936, Serial No. 90,603
In Germany July 16, 1935

4 Claims. (Cl. 170—159)

This invention relates to an air-screw with an adjustable non-metallic blade of wood, artificial material or the like.

Divers proposals have already been made for fitting adjustable blades of wood, artificial material or the like into the bosses of air-screws. Thus, it has been proposed, inter alia, first to fit the root of the blade into the boss and then to fill up the gaps left between the two parts with cement or putty. It has also been proposed to make the root of hard wood and the blade proper of light wood.

Again, the use of metal ferrules anchored to the hubs of non-metallic blades has been proposed. Further, it has been proposed to provide non-metallic blades with a metallic coating by electro-deposition.

According to the present invention the root of the non-metallic blade is provided with a sprayed-on metal coating.

Preferably, the area of adhesion of the sprayed metal of the wood is increased by a particular formation of the root, for example by the provision of depressions or elevations.

In the preferred embodiments the depressions or the cavities between the elevations are so formed and arranged that when filled up with sprayed metal they afford additional anchorages or reinforcements The anchorages or reinforcements are preferably produced by the act of spraying the metal and are integral with the coating sprayed on to the root.

The anchorages may be of different form, for example, they may have the form of longitudinal radially directed ribs, which taper in cross section towards the axis of the root. They may, however, also have the form of radial, cylindrical, or similar pegs.

In the accompanying drawing there are illustrated embodiments of an adjustable blade according to the invention.

Fig. 1 shows diagrammatically in elevation a blade with a metal coating on the root produced by spraying.

Fig. 2 shows an embodiment of the coating of the root with anchorages to a larger scale on the line 2—2 of Fig. 3, the sprayed-on metal coating being partly broken away.

Fig. 3 is a cross-section on the line 3—3 of Fig. 2.

Fig. 4 is a view similar to Fig. 2 showing a second embodiment, in section, on the line 4—4 of Fig. 5.

Fig. 5 is a cross-section on the line 5—5 of Fig. 4, the sprayed-on metal coating being partly broken away.

In Fig. 1, 1 denotes the root of the adjustable screw blade which may consist of wood, artificial material or the like, the said root being provided with an envelope or coating 3 consisting of sprayed metal. This envelope preferably surrounds not only the cylindrical part of the root 1 but also its end face 4, although the latter is not necessary. The metal envelope may be provided with anchorages projecting into the root, as indicated in dotted lines in Fig. 1 in different form and dimensions at 5, 6, and 7.

In the embodiment shown in Figs. 2 and 3 the root 1 is provided at its cylindrical part and also on the end face with a sprayed-on metal coating 3.

The root is formed with longitudinal radially directed incisions 8 which taper in cross-section towards the axis of the root.

In spraying the metal coating 3 the metal is also sprayed into these incisions 8, so that the cylindrical coating is in one with radial ribs 9 which project into the root and afford an extremely firm connection, with a high capacity for resistance, between the sprayed metal and the root. The ribs form reinforcements or anchorages for the sprayed metal coating surrounding the surface of the root.

In the modification shown in Figs. 4 and 5 these reinforcements or anchorages are shaped in the form of radially disposed pegs 10 which are also produced simultaneously with the spraying of the coating. For this purpose there are provided in the root depressions 11 which give the desired form to the peg-like anchorages or reinforcements.

The anchorages or reinforcements may, however, have any other form, it being essential only that, together with the sprayed-on metal coating, they impart to the root so great a capacity to resist the stresses which are met with in use that the blades cannot be torn off.

It is possible by adoption of a suitable form to realize so secure an adhesion of the metal to the wood, that, when subjected to tension stresses, the connection between the metal and the wood has the same capacity to resist the stresses as the remaining cross-section of the wood.

It is also within the scope of the invention to produce the anchorages or reinforcements separately from the spraying on of the metal coating and to connect the same with the metal coating, though this last arrangement is not so advantageous as that first described.

The anchorages or reinforcements may also be produced by groove-like depressions which are preferably provided on the root parallel to its axis somewhat in the manner of the incisions 8, which groove-like depressions do not penetrate so deeply into the wood as do the incisions 8 of the embodiment shown in Figs. 2 and 3.

It is also possible to spray the metal coating only on a part of the root and not so far as to the point where the root merges into the blade proper.

I wish it to be understood that the invention is not limited to the details shown in the drawing and described in the specification, but that other modifications fall within the scope of the invention.

I claim:—

1. An air screw comprising a non-metallic blade having a root, said root being provided with a sprayed-on metal coating, said coating having integral therewith portions of sprayed on metal which project into the material of said root and other portions of sprayed-on metal which surround at least partially portions of said root which form projections.

2. An air-screw comprising a non-metallic blade, and the root of said blade being provided with a sprayed-on metal coating and having a formation increasing the area of adhesion of the sprayed-on metal, said formation of said root comprising depressions alternating with elevations so formed and arranged that, when filled with metal, they afford additional anchorages for said metal coating, said anchorages having the form of longitudinally radially directed ribs tapering in cross-section towards the axis of the root.

3. An air-screw comprising a non-metallic blade, and the root of said blade being provided with a sprayed-on metal coating and having a formation increasing the area of adhesion of the sprayed-on metal, said formation of said root comprising depressions alternating with elevations so formed and arranged that, when filled with metal, they afford additional anchorages for said metal coating, said anchorages having the form of radial pegs.

4. An air-screw comprising a blade of wood, and the root of said blade being provided with a sprayed-on metal coating and having a formation increasing the area of adhesion of the sprayed-on metal, said formation of said root comprising depressions alternating with elevations so formed and arranged that, when filled with metal, they afford additional anchorages for said metal coating, said anchorages having the form of pegs of cylindrical shape.

ALFRED KOYEMANN.